Oct. 15, 1968  F. J. ADAMS  3,405,523
POWER STEERING AND LIKE SYSTEMS
Filed Aug. 4, 1966
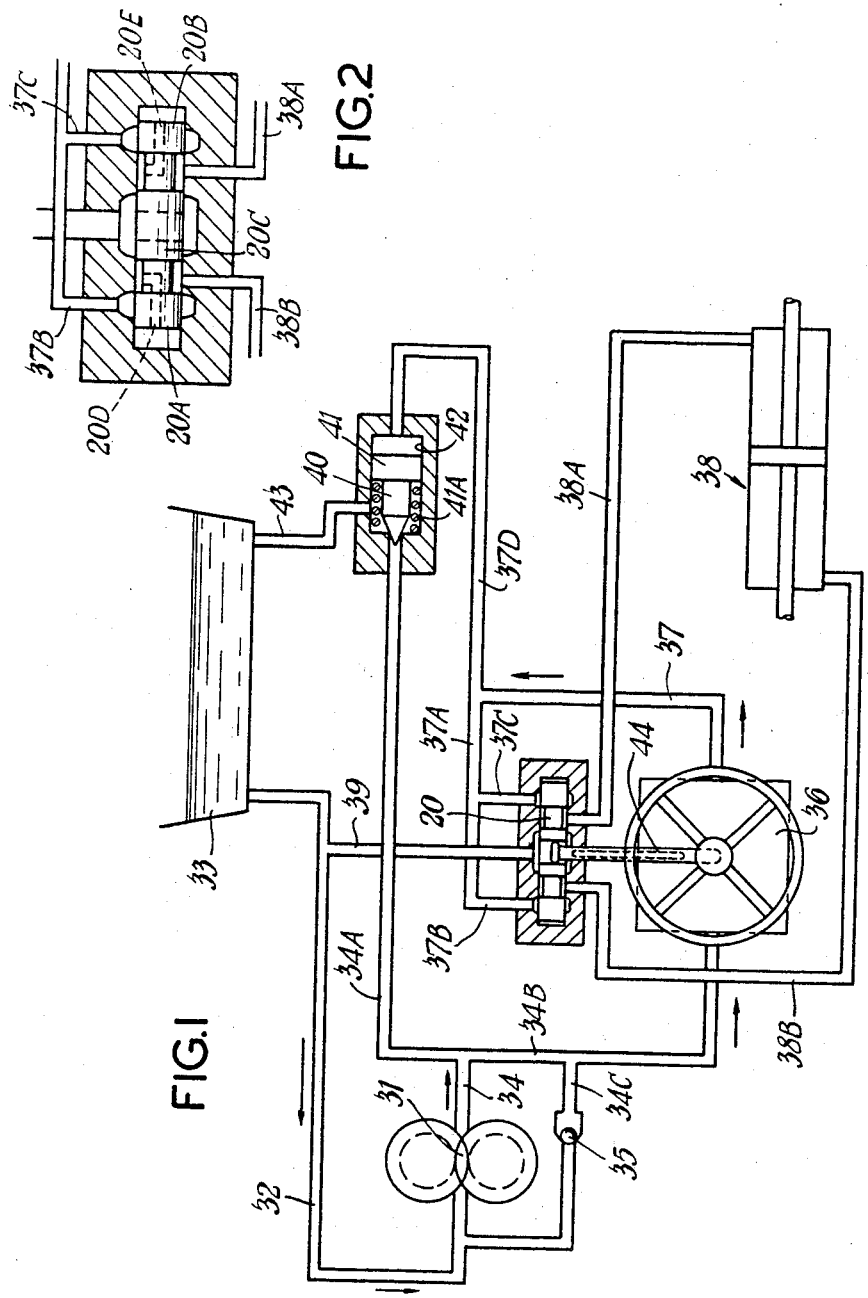

United States Patent Office 3,405,523
Patented Oct. 15, 1968

3,405,523
POWER STEERING AND LIKE SYSTEMS
Frederick John Adams, Campton, near Shefford, England, assignor to Cam Gears (Luton) Limited, a company of Great Britain
Filed Aug. 4, 1966, Ser. No. 570,250
Claims priority, application Great Britain, Aug. 6, 1965, 33,747/65
8 Claims. (Cl. 60—52)

ABSTRACT OF THE DISCLOSURE

A servo-control for power steering systems having a double acting servomotor, a power driven pump receiving fluid from a source, a unidirectional manually driven pump receiving fluid from the power driven pump or from said source, a valve controlling flow from the manually driven pump to the servomotor, means responsive to torque from the manually driven pump for shifting said valve for selectively controlling flow of fluid to the opposite sides of the servomotor and a valve closed by pressure from the manually driven pump controlling recirculation of fluid between the power driven pump and the source. The torque responsive means may be a mechanical linkage between the manually driven pump and the valve and the manually driven pump may be a radial piston displacement pump.

---

This invention relates to power steering and servo-control of the kind in which an operation in either sense of direction is required under the control of the operator in like sense, especially in the steering of vehicles, it is desirable to provide that if a main source of power fails, the operator can still cause actuation of the servomotor. It is also desirable that the operator should be able to "feel" through the control, the response which is controlling. This invention relates mainly (though not necessarily) to all-hydraulic control, i.e. one which does not involve direct mechanical linkage between driving manipulation and the thing controlled as is often present in power-assisted control. The present invention is therefore primarily concerned with entirely hydraulic power steering. It is sometimes the case in power steering systems that in some driving circumstances, the pump-like device directly moved by the driver acts as a pump directly contributing to the pressure of a main source, whilst in other circumstances the so-called pump is in reality acting mainly as a meter; it is however desirable that in these or indeed any circumstances of driving, the factor of "feel" should be present. In the following description and claims the term operator's pump comprises any such pump-like device.

The invention seeks to meet the requirements in an effective, simple and economic manner.

According to the invention a system is provided for power steering or like servo-control in which a primary source of pressure fluid has its output connected for bypass back to a reservoir subject to the closing of a cut-off valve controlled by pressure generated by an operator's pump, the primary pressure when not so bypassed being directed to actuate in one or other sense the servomotor being controlled, according to the sense in which the operator's pump is moved by the operator.

The operators' pump is a unidirectional pump driven by the operator in either sense of rotational direction through sensing means which operates a directional valve (determining the sense of actuation of the servomotor) and which may also transmit "feel" back to the operator. Such "feel" may be purely mechanical reaction, or may be set up by hydraulic pressure.

The invention may be more clearly understood from the following description of an example of it, aided by the accompanying drawings in which FIGURE 1 schematically illustrates a power-steering system, and FIGURE 2 illustrates an alternative form of direction valve.

In the system of FIGURE 1 there is represented at 31 a hydraulic power pump, for example a pump driven by the engine of a vehicle. This pump, drives fluid through duct 32 from a reservoir 33: it delivers pressure fluid through duct 34, with branches 34A, 34B. Branch 34B has a branch 34C with a non-return valve 35, to permit flow from reservoir 33 through 32 to the intake side of the operators' pump to be described below. The valve 35 opens so as to bypass the pump 31 if the pump 31 fails to deliver, so that emergency operation, or operation with the engine stopped, is possible. The system is kept topped up from the reservoir 33 through the valve 35 when operating as a purely manual system, fluid from the reservoil entering the system via duct 32, valve 35 and branch 34C, such fluid being sucked by the operator's pump 36.

Through 34, 34B, the pump 31 delivers pressure fluid into the operators' pump 36. This is a unidirectional driver-operated positive pump (such as a conventional piston and cylinder pump of radial arrangement). The output of pump 36 is by duct 37, and is branched into ducts 37A, 37D. Duct 37A is connected by twin branches 37B and 37C to the input ports of a sliding spool valve 20, from the output ports of which lead two servomotor ducts 38A, 38B connecting to the two sides of a double-acting steering servomotor 38. Between the duct 32 (and reservoir 33) and centre chamber of the valve 20 is a duct 39.

The branch 34A from pump 31 leads to a cut-off valve comprising a tapered valve 40 moved by a piston 41 in a cylinder 42 to which duct 37D is connected, a spring 41A urging the piston 41 to the right (as viewed) and thus urging valve 40 towards open position. It follows that if there is no pressure in 37D the valve 40 is open and the output of pump 31 is fully bypassed back into the reservoir (through duct 43). When there is pressure, or sufficient pressure, in 37D, valve 40 is closed and the total available pressure and flow is available to the servomotor 38.

The valve 20 is, in the example, actuated in response to such torque as the driver may exert in operating the pump 36, means for so doing being purely notionally indicated in FIGURE 1 by the representation of a mechanical connection in the form of an arm or lever 44. It is to be understood that when the valve 20 is in its neutral position no fluid can pass through 38A or 38B, and in this condition there is no flow through the pump 36 and the duct 37. Only when torque is applied to the pump 36 by the operator is valve 20 moved from neutral because of the torque reaction, and therefore valve 40 is closed by the pressure in 37D. Otherwise, the valve 40 is open and the output of pump 31 is bypassed back to the reservoir, through the duct 43.

Now, assume the driver to apply steering torque to the pump 36. Valve 20 is thereby opened to one or other of the ducts 37B, 38B; or 37C, 38A according to the sense of the applied torque. Pressure from pump 31, augmented or passed by pump 36, now actuates the servomotor 38 in the corresponding sense. When the driver centralises his wheel and therefore "neutralises" valve 20, the servomotor 38 is hydraulically locked. Duct 39 retains any valve leakage there may be, to the compressional side of the system.

Now, if pump 31 fails to deliver, pump 36 can take over completely, supplying the requisite pressure fluid to the servomotor 38 via 37, 37A, to the direction valve which (pump 36 being operational) must be open to one sense or the other. By virtue of the directional response of the valve 20 the pump 36 is simply a unidirectional pump, that is to say a pump which pumps in one sense of direction only, whichever sense of rotation is applied.

The modified direction valve of FIGURE 2 comprises a spool having lands at each end, 20A and 20B and a central land 20C. Through the lands 20A, 20B are restricted passages 20D and 20E which connect spaces between 20A, 20C and 20B and 20C respectively. The valve itself transmits back to the driver a "feel" of the effective servomotor pressure which he has caused to be exerted, by reason of the hydraulic pressure acting on either end of the spool. Different degrees of feel may be provided by using spools of differing cross-sectional area. With such a valve, therefore, the torque applied to the pump 36 need not be sensed by the driver. Clearly however, both torque and pressure may be sensed for "feel." Such a system, as will be appreciated from the foregoing, has the advantage that the output of the main pump 31 is virtually freely bypassed in the "no steer" condition, so that insignificant energy is wasted, and the temperature of the working fluid is not likely to become excessive. It has also been seen that a "fail safe" provision is made in that the operators' pump 36 can effectively actuate the servomotor 38 on its own account.

What I claim is:

1. A servo-control for power steering systems and the like comprising a power operated pump receiving fluid from a source, a manually operated unidirectional pump receiving fluid from both the source and from the power operated pump, a double acting servomotor responsive in both senses of direction to fluid from said manually operated pump, a valve selectively controlling the flow of fluid from said manually operated pump to both sides of said double acting servomotor, torque responsive means actuated by said manually operated pump for shifting said valve to control the sense of operation of said servomotor in accordance with the sense of direction of the operation of said manually operated pump, and a valve controlled by fluid pressure from the manually operated pump regulating recirculation between the power operated pump and the source of fluid.

2. A servo-control according to claim 1 wherein the torque responsive means is a mechanical linkage between the manually operated pump and said first mentioned valve.

3. A servo-control according to claim 1 including a bypass around the power operated pump accommodating flow of fluid from the source to the manually operated pump and a one-way valve in said bypass preventing backflow to the source.

4. A servo-control according to claim 1 wherein the second mentioned valve is spring biased to open position.

5. The servo-control according to claim 1 wherein the first mentioned valve is a two-way spool valve transmitting back to the driver of the manually operated pump a feel of the effective servomotor pressure exerted by the manually operated pump.

6. A servo-control according to claim 1 wherein the second mentioned valve, in its open condition accommodates free recirculation of the fluid from the power operated pump to the source to minimize temperature buildup of the fluid.

7. A servo-control according to claim 1 wherein the manually operated pump is effective to actuate the servomotor without assist from the power operated pump.

8. A power steering system which comprises a power operated unidirectional pump, a manually operated unidirectional pump, a double acting servomotor responsive in both senses of direction to fluid pressure from either or both of the said pumps, a fluid reservoir connected to supply both the said pumps, a first pressure controlled valve openable to flow from the said power operated pump to said reservoir and closable by fluid pressure from said manually operated pump, a two-way valve selectively controlling the flow of pressure fluid from said manually operated pump to one or the other side of said servomotor, and means whereby torque applied to said manually operated pump effects a shifting of said two-way valve to determine the extent and sense of operation of the servomotor.

References Cited
UNITED STATES PATENTS

| | | | |
|---|---|---|---|
| 2,008,687 | 7/1935 | Dean | 60—53 |
| 2,020,951 | 11/1935 | Lemon | 60—52 |
| 2,414,451 | 1/1947 | Christensen | 60—545 |
| 2,836,960 | 6/1958 | Wittren | 60—52 |
| 3,360,932 | 1/1968 | Lech et al. | 60—52 |

EDGAR W. GEOGHEGAN *Primary Examiner.*